Sept. 8, 1964  S. S. FOUSE  3,148,312
MULTI-PHASE ELECTRIC POWER DISTRIBUTION BUS STRUCTURE
Filed Dec. 22, 1960  2 Sheets-Sheet 1
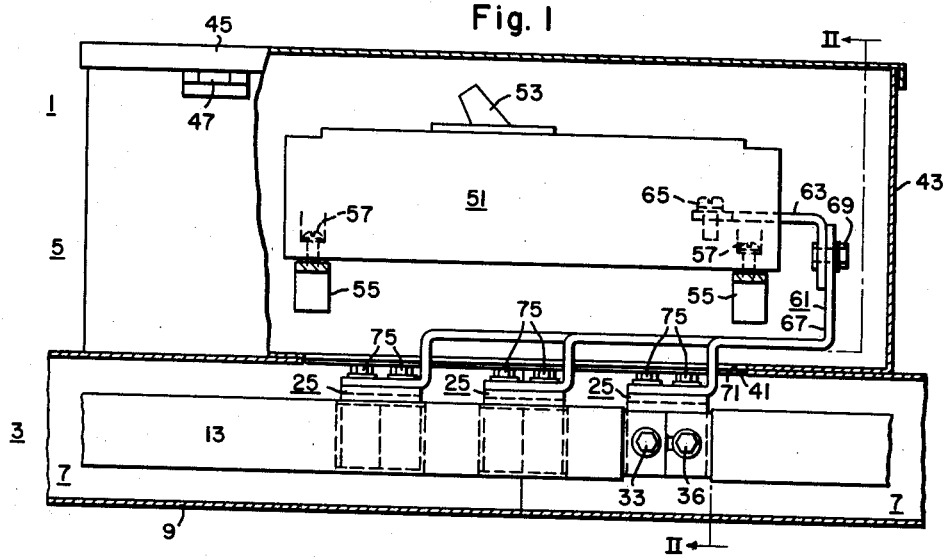
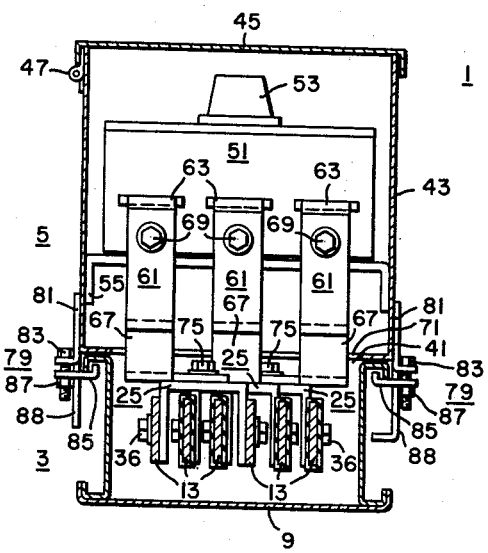
WITNESSES
John E. Healy, Jr.
William A. Elchik
INVENTOR
Samuel S. Fouse
BY
ATTORNEY Sept. 8, 1964 S. S. FOUSE 3,148,312
MULTI-PHASE ELECTRIC POWER DISTRIBUTION BUS STRUCTURE
Filed Dec. 22, 1960 2 Sheets-Sheet 2
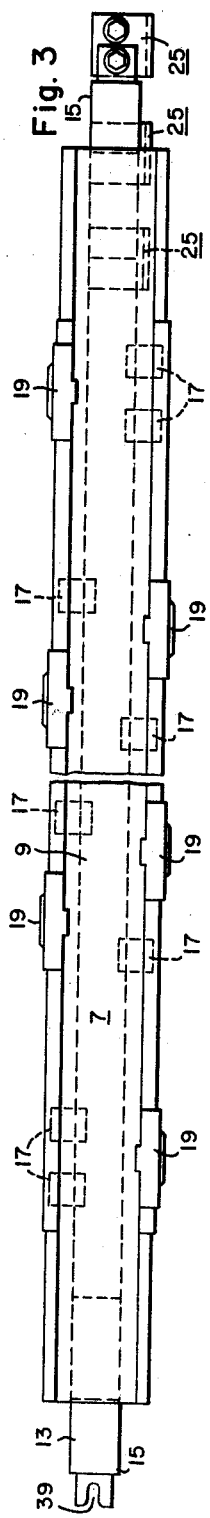
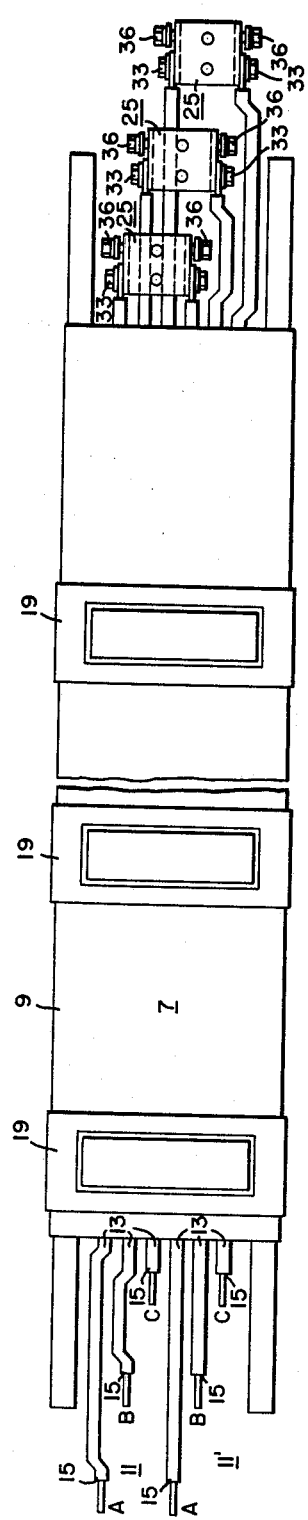
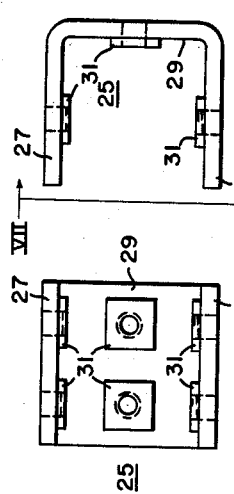
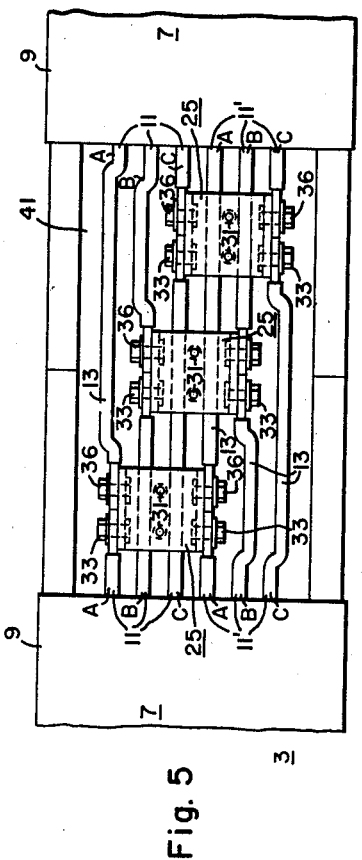

United States Patent Office 3,148,312
Patented Sept. 8, 1964

3,148,312
MULTI-PHASE ELECTRIC POWER DISTRIBUTION
BUS STRUCTURE
Samuel S. Fouse, Hopewell Township, Beaver County, Pa., assignor to Westinghouse Electric Corporation, East Pittsburgh, Pa., a corporation of Pennsylvania
Filed Dec. 22, 1960, Ser. No. 77,589
8 Claims. (Cl. 317—120)

This invention relates to electric power distribution apparatus and more particularly to connected sections of bus duct and power take-off units for tapping power off of the bus duct at the connections.

In a low impedance multi-phase bus duct system it is desirable to collect like-phase conducting bus bars at the connection between two sections of bus duct to equalize the load on the bus bars. In the past, this type of connection was constructed without adequate provision being made for tapping power off of the bus duct at the connection. Thus, this space along the length of the bus duct was not available for the connection of power take-off devices.

Accordingly, an object of this invention is to provide an improved multi-phase bus duct system with improved bus bar connectors that collect like-phase conducting bus bars and improved means for tapping power off of the bus bar connectors.

Another object of the invention is to provide at least two sections of bus duct connected together by means of improved bus bar connectors that collect like-phase conducting bus bars, which connectors are constructed and positioned to enable connection therewith of power take-off devices.

A further object of the invention is to provide an improved power take-off unit that can be connected to bus bar connectors that collect like-phase conducting bus bars at the connection.

In accordance with one embodiment of the invention, a section of bus duct is provided comprising a housing and two sets of multi-phase bus bars, all of which bus bars are supported in the housing in a parallel spaced mutually flatwise relation. A plurality of U-shaped conducting connectors are supported at one end of the bus duct section. Each of the U-shaped connectors has one leg bolted to an end of one bus bar in a first of the sets and the other leg bolted to an end of a like-phase conducting bus bar in the second of the sets. A second bolt is captured on each leg of each of the U-shaped connectors. Each of the bus bars has a slot therein at the end opposite the end to which the U-shaped connector is attached. The bus bars of two similar sections are connected in an end-to-end relationship with the two captured bolts in the two legs of each U-shaped connector of one section fitting into the slots in two like-phase conducting bus bars of the two sets of the other section. The captured bolts are then tightened to connect the bus bars of the one section to the U-shaped connectors that are supported in the other section. Thus, four like-phase conducting bus bars from the four sets of multi-phase bus bars of the two sections are physically and electrically connected by each of the U-shaped connectors.

The U-shaped connectors are spaced longitudinally along the bus duct, and the base portions thereof are all disposed in the same general plane, which plane is generally parallel to one side of the bus duct housing. A power take-off unit comprising a housing and a multi-pole circuit breaker supported within the housing, is removably mounted on the bus duct. A plurality of electrical connecting structures are connected at one end to the circuit breaker. Each of the connecting structures has a flat face at its other end engaging the base of one of the U-shaped connectors. Means are provided for bolting the connecting structures to the U-shaped connectors. The U-shaped connectors and the plug-in unit are adapted to be connected from either of two sides of the bus duct since, for certain installations, one side of the bus duct may be against a wall or other obstruction.

For a better understanding of the nature and objects of the invention, reference may be had to the following detailed description, taken in conjunction with the accompanying drawings, in which:

FIGURE 1 is a top view, partly in section, of part of a bus duct system illustrating features of the invention;

FIG. 2 is a sectional view taken along line II—II of FIG. 1;

FIG. 3 is a top view, on a reduced scale, of a section of bus duct of the invention;

FIG. 4 is a side view of the section of bus duct shown in FIG. 3;

FIG. 5 is a view illustrating a connection of two sections of bus duct of the type seen in FIGS. 3 and 4;

FIG. 6 is a side elevational view of one of the U-shaped connectors seen in FIGS. 4 and 5; and FIG. 7 is a view taken along line VII—VII of FIG. 6.

Referring to the drawings, a part 1 of a bus duct system of electrical power distribution is shown in FIGS. 1 and 2, and it comprises a run of bus duct which is shown partially at 3 and a plug-in unit 5 mounted to tap power off of the bus duct 3. The bus duct 3 comprises two similar sections each of which is partially shown at 7, which sections are connected together in a manner to be hereinafter specifically described.

One of the sections 7 of bus duct is shown more clearly in FIGS. 3 and 4, and it comprises a metallic housing 9 having arranged therein two sets 11 and 11' of multi-phase bus bars 13. Each of the sets 11 and 11' of bus bars 13 comprises three bus bars A, B and C conducting the phases of a three-phase power distribution system. Each of the bus bars 13 is insulated at 15. The insulation 15 is removed near the ends of the bus bars 13 to facilitate electrical connection of the bus bars. All six of the bus bars 13 are supported in the housing 9 in a generally parallel mutually flatwise relation by means of a plurality of insulating support members 17 (FIG. 3) that are staggered lengthwise on opposite sides of the bus bars. A plurality of sliding cover plates 19 are staggered on opposite sides of the bus duct housing 9. The cover plates 19 are slideable lengthwise to expose openings in the bus duct housing which openings receive contact elements of bus duct plug-in units (not shown) that are used to tap power off of the bus duct in a manner well known in the art.

Three bus bar connectors 25 (FIGS. 6 and 7) are supported at one end of the bus duct section 7 (FIGS. 3 and 4). As seen more clearly in FIGS. 6 and 7, each of the bus bar connectors 25 comprises a U-shaped member of conducting material comprising two legs 27 connected by means of a base or cross-over part 29. Two plug nuts 31 are supported in each of the legs 27 and in the base 29 of each generally U-shaped bus bar connector 25. Each of the plug nuts 31 comprises a tapped member that is secured in a suitable opening in the U-shaped connector 25 by means of a press-fitting operation.

Referring now to FIGS. 3 and 4, three U-shaped bus bar connectors 25 are connected to the uninsulated ends of the bus bars 13 at one end of the section 7 of bus duct. Each of the bus bar connectors 25 connects two like-phase conducting bus bars 13 from the two sets 11 and 11' of multi-phase bus bars. One leg of each of the U-shaped bus bar connectors 25 is secured to the uninsulated end of one of the bus bars 13 of the set 11 by means of a bolt 33, and the other leg 27 of each U-shaped bus bar connector 25, is secured to the uninsulated end of a like-phase conducting bus bar 13 from the set 11' by means of a bolt 33. As seen in FIG. 4, a bolt 36 is partly screwed into the plug nut 31 in the free side of each of the legs of each U-shaped connector 25.

As shown in FIG. 3, each of the bus bars 13 has a slot 39 therein at the end of the bus bar which is opposite the end that supports the bus bar connector 25.. When two similar sections 7 of bus duct are to be connected, the slotted end of one section 7 is placed adjacent the connector-supporting end of the other section 7 and the sections are moved together with the slot 39 in each of the bus bars in the one section receiving the shank portion of one of the bolts 36 in the other section. The bus bars from the two sections engage in an end-to-end relationship as seen in FIG. 5, and the bolts 36 are tightened drawing the bus bars 13 of the slotted section, which section is seen at the right hand side in FIG. 5, tightly against the U-shaped bus bar connectors 25. When the sections 7 are connected together (FIG. 5), four like-phase conducting bus bars from the four sets 11 and 11' of the two bus bar duct sections 7 are electrically and physically connected by each of the three generally U-shaped bus bar connectors 25. The bus bar connectors 25 are spaced longitudinally with respect to the bus duct. The base parts 29 of the three bus bar connectors 25, are disposed in the same general plane, which plane is parallel to one side of the bus duct housing 9. This arrangement facilitates connection to the bus bar connectors 25 of connecting structures of a power take-off unit which connection will be hereinafter specifically described.

Referring to FIGS. 1 and 2, the circuit interrupting power take-off unit 5 comprises a housing 43 having an openable cover 45 mounted thereon by means of two hinges 47. A circuit breaker indicated generally at 51 is supported on two brackets 55 that are welded or otherwise suitably secured to two opposite inside walls of the housing 43. The circuit breaker 51 is secured to the brackets 55 by means of a plurality of bolts 57 (FIG. 1). The circuit breaker may be of the type shown, for example, in the patent to R. C. Strother et al., Patent No. 2,937,252, issued May 17, 1960, and assigned to the assignee of the instant application. The circuit breaker 51 is a multi-pole circuit breaker having three pole units therein for interrupting the three phases of a multi-phase system of electrical power distribution. Three connecting structures indicated generally at 61 are provided for electrically connecting the three pole units of the circuit breaker 51 to the three generally U-shaped bus bar connectors 25. Each of the connecting structures 61 comprises a generally L-shaped conductor 63 that is connected at one end to a terminal of one of the pole units of the circuit breaker 51 by means of a bolt 65 (FIG. 1). The other end of each of the generally L-shaped conductors 63 is connected to one end of a conducting member 67 by means of a bolt 69. The other end of each of the conducting members 67 passes through an opening 71 in the base of the take-off unit housing 43, and through the opening 41 in the bus duct housing 9, and a flat part thereof engages the flat base part 29 (FIGS. 6 and 7) of one of the U-shaped bus bar connectors 25.

The connecting end of each conducting member 67 is flat to provide maximum surface engaging area between the member 67 and the bus bar connector 25 to which it is connected. Each of the connecting members 67 is bolted to one of the three U-shaped bus bar connectors 25 by means of two bolts 75 that pass through suitable openings in the member 67 and thread into the two plug nuts 31 (FIGS. 6 and 7) that are supported in the base 29 of the bus bar connector 25.

The power take-off unit 5 is supported on the bus duct 3 by four supporting structures 79, only two of which are shown in FIG. 2. Each of the supporting structures 79 comprises a generally L-shaped bracket 81 that is welded or otherwise suitably attached to the side of the take-off unit housing 43, a bolt 83, a second bracket 85, and a nut 87. Each of the brackets 85 has a bent over part at one end that fits under a generally L-shaped flange part of the housing 9. Each of the bolts 83 passes through a suitable opening in one of the brackets 81 and an opening in one of the brackets 85. The nuts 87 are tightened to draw the take-off unit 5 against the bus duct 3. The brackets 81 extend down at 88 to protect the connecting structures 61 when the take-off unit 5 is free of the bus duct 3 and is placed on a flat surface.

Suitable conductors (not shown) are connected to the load terminals of the circuit breaker 51 to supply power to a load circuit in a manner well known in the art. The circuit from the bus bars 13 through the U-shaped connectors 25, the connecting structures 61, and the circuit breaker 51, is controlled either manually by operation of the circuit breaker handle 53 or by means within the circuit breaker responsive to an overload current in any of the three pole units to effect automatic opening of the circuit breaker in a manner well known in the art.

From the foregoing description, it is apparent that the invention provides improved means for connecting the bus bars of multi-phase low impedance bus duct sections or lengths, which connecting means electrically collects the like-phase conducting bus bars at the connection. The bus bar connectors are so constructed and positioned as to enable connection therewith of the electrical connecting structures of a circuit interrupting power take-off unit that is mounted on the bus duct. The power take-off unit can be connected to the bus bar connectors without disturbing the bolted connection of the bus bars of the two sections of bus duct. Only three simplified electrical connecting structures are required to tap power off of the two sets of multi-phase bus bars. The bus bar connectors can be mounted on either of two opposite sides of the bus duct housing so that, if one side is obstructed by means of a wall or other obstruction, the power take-off unit can be mounted at the opposite or unobstructed side. The improved means for tapping power off of the connected sections of bus duct at the connection not only provides for additional available power take-off space along the length of the plug-in type bus duct shown in the drawings; but this improved power take-off means can be used in multi-phase low impedance feeder type bus duct which bus duct ordinarily does not embody connections that are constructed to enable connection thereto of a power take-off unit such as is shown in the drawings.

Having described the invention in accordance with the patent statutes, it is to be understood that various changes and modifications may be made in the structural details thereof without departing from some of the essential features of the invention.

I claim as my invention:

1. Multi-phase electric power distribution apparatus comprising, in combination, a first and a second section of bus duct, each of said sections comprising a housing and two sets of multi-phase bus bars supported within the housing, all of the bus bars in each of said sections being supported in a generally parallel face-to-face relationship with the two sets being adjacent to each other whereby all like-phase conducting bus bars are separated from each other by at least one bus bar that conducts a different phase, means connecting the bus bars of the first section with the bus bars of the second section, said connecting means comprising a plurality of bus bar connectors each of which electrically connects together four like-phase conducting bus bars comprising one bus bar from each of the said four sets of said two sections, a power take-off unit comprising a circuit interrupting device, means for mounting the power take-off unit on the bus duct, and means for electrically connecting the circuit interrupting device to the bus bar connectors.

2. In multi-phase electric power distribution apparatus, a first and a second section of bus duct, each of said sections comprising a housing and two sets of bus bars supported adjacent to each other within the housing, each of said sets comprising three bus bars each of which conducts a different phase of a three-phase system of power distribution, in each of said sections all of the bus bars of the two sets being supported in a generally parallel face-to-face relationship with the like-phase conducting bus bars being separated from each other by at least one bus bar that conducts a different phase, means connecting the bus bars of the first section with the bus bars of the second section, said connecting means comprising three bus bar connectors each of which electrically connects together four like-phase conducting bus bars from the four sets of the two sections, a power take-off unit comprising a housing, a three-pole circuit interrupting device supported within the power take-off unit housing, means for mounting the power take-off unit on the bus duct housing in proximity to said connection, and means for electrically connecting each of the three-pole units of the circuit interrupting device to a different one of the three bus bar connectors.

3. In multi-phase electrical power distribution apparatus, a first and a second section of bus duct, each of said sections comprising two sets of bus bars, each of said sets comprising a plurality of multi-phase bus bars, the bus bars in each section being supported in a generally parallel face-to-face relationship with the like-phase conducting bus bars being separated from each other by at least one bus bar that conducts a different phase, means connecting said sections together comprising a plurality of generally U-shaped connecting members each of which comprises two legs and a base, each leg of each generally U-shaped connecting member being connected to one bus bar from each of said sections, each of said generally U-shaped connecting members electrically connecting four bus bars each of which conducts current of the same phase, the bases of said plurality of generally U-shaped connecting members being disposed in the same general plane, a power take-off unit comprising a circuit interrupting device, means for mounting the power take-off unit on the bus duct, and means for electrically connecting the circuit interrupting device to the bases of said generally U-shaped connecting members.

4. Multi-phase electric power distribution apparatus comprising, in combination, a first and a second section of bus duct, each of said sections comprising two sets of bus bars, each of said sets comprising three bus bars of a multi-phase system of power distribution, all of the bus bars in each section being supported in a generally parallel face-to-face relationship with the two sets being adjacent to each other whereby the two bus bars of each of the three pairs of like-phase conducting bus bars are separated from each other by at least one bus bar that conducts a different phase, means connecting said sections comprising three generally U-shaped bus bar connectors each of which comprises two legs and a base, each leg of each generally U-shaped bus bar connector being connected to one bus bar from each of said sections whereby each generally U-shaped bus bar connector electrically connects four bus bars comprising one bus bar from each of said four sets of said two sections, a power take-off unit comprising a three-pole circuit interrupting device, and means for electrically connecting each pole unit of said three-pole circuit interrupting device to a different one of said three generally U-shaped bus bar connectors.

5. In multi-phase electric power distribution apparatus, a first and a second section of bus duct, each of said sections comprising two sets of bus bars, each of said sets comprising a plurality of multi-phase bus bars, all of the bus bars in each section being supported in a generally parallel face-to-face relationship with the like-phase conducting bus bars being separated from each other by at least one bus bar that conducts a different phase, means connecting said sections together comprising a plurality of generally U-shaped bus bar connectors each of which comprises two legs and a base, each leg of each generally U-shaped bus bar connector being connected to one bus bar from each of said sections whereby each generally U-shaped bus bar connector electrically connects four bus bars all of which conduct current of the same phase, the bases of said plurality of generally U-shaped connecting members being disposed in the same general plane and being spaced longitudinally along the length of said bus duct, a power take-off unit comprising a circuit interrupting device, means for mounting the power take-off unit on the bus duct, a plurality of current conducting connecting structures each of which is connected at one end to the circuit interrupter, the other end of each of said connecting structures having a flat face for engaging the base of one of said generally U-shaped bus bar connectors, and means for securing said connecting structures to the bases of said bus bar connectors.

6. In multi-phase electric power distribution apparatus, a first and a second section of bus duct, each of said sections comprising two sets of bus bars, each of said sets comprising a plurality of multi-phase bus bars, the bus bars in each section being supported in a generally parallel face-to-face relationship with the like-phase conducting bus bars being separated from each other by at least one bus bar that conducts a different phase, means connecting said sections comprising a plurality of generally U-shaped bus bar connectors each of which comprises two legs and a base, each leg of each generally U-shaped bus bar connector being connected to one bus bar from each of said sections whereby each of said generally U-shaped bus bar connectors electrically connects four bus bars that conduct current of the same phase, and the bases of said plurality of generally U-shaped bus bar connectors being disposed in the same general plane.

7. Multi-phase electrical power distribution apparatus comprising, in combination, a first and a second elongated section of bus duct, each of said sections comprising two sets of bus bars, each of said sets comprising a plurality of multi-phase bus bars, the bus bars in each of said sections being supported in a generally parallel face-to-face relationship with all of the like-phase conducting bus bars being separated from each other by at least one bus bar that conducts a different phase, means connecting said sections together comprising a plurality of generally U-shaped bus bar connectors each of which comprises two legs and a base, each leg of each generally U-shaped bus bar connector being connected to one bus bar from each of said two sections whereby each of said generally U-shaped bus bar connectors electrically connects four bus bars that conduct current of the same phase, the bases of said plurality of generally U-shaped bus bar connectors being disposed in the same general plane and being spaced longitudinally with respect to said bus duct.

8. A section of bus duct comprising an elongated housing, two sets of bus bars supported inside of said housing, each of said sets comprising a plurality of multi-phase bus bars, all of said bus bars being supported in a generally parallel face-to-face relationship with the two sets being adjacent each other and all like-phase conducting bus bars being separated from each other by at least one bus bar that conducts a different phase, a plurality of generally U-shaped bus bar connectors supported at one end of said section, one leg of each of said generally U-shaped connectors being connected to a bus bar from one of said sets and the other leg being connected to a like-phase conducting bus bar from the other of said sets, each of said bus bars having a slot therein at the other end of said section, and connecting means in each leg of each generally U-shaped connector for insertion into the slot in a bus bar of a similar section of bus duct for connecting the bus bars of said two similar sections in an end-to-end relationship.

References Cited in the file of this patent

UNITED STATES PATENTS

| | | |
|---|---|---|
| 2,042,778 | Frank | June 2, 1936 |
| 2,043,796 | Frank | June 9, 1936 |
| 2,261,857 | Novak | Nov. 4, 1941 |
| 2,641,636 | Born | June 9, 1953 |
| 2,871,285 | Fouse | Jan. 27, 1959 |
| 2,883,637 | Born | Apr. 21, 1959 |
| 2,912,603 | Farnsworth | Nov. 10, 1959 |
| 2,942,157 | Davis | June 21, 1960 |